No. 629,854. Patented Aug. 1, 1899.
J. W. HALL.
HOISTING CAGE FOR MINES.
(Application filed May 8, 1899.)
(No Model.) 3 Sheets—Sheet 1.

Attest: M. P. Smith, A. J. McCauley

Inventor: James W. Hall

No. 629,854. Patented Aug. 1, 1899.
J. W. HALL.
HOISTING CAGE FOR MINES.
(Application filed May 8, 1899.)
(No Model.) 3 Sheets—Sheet 2.
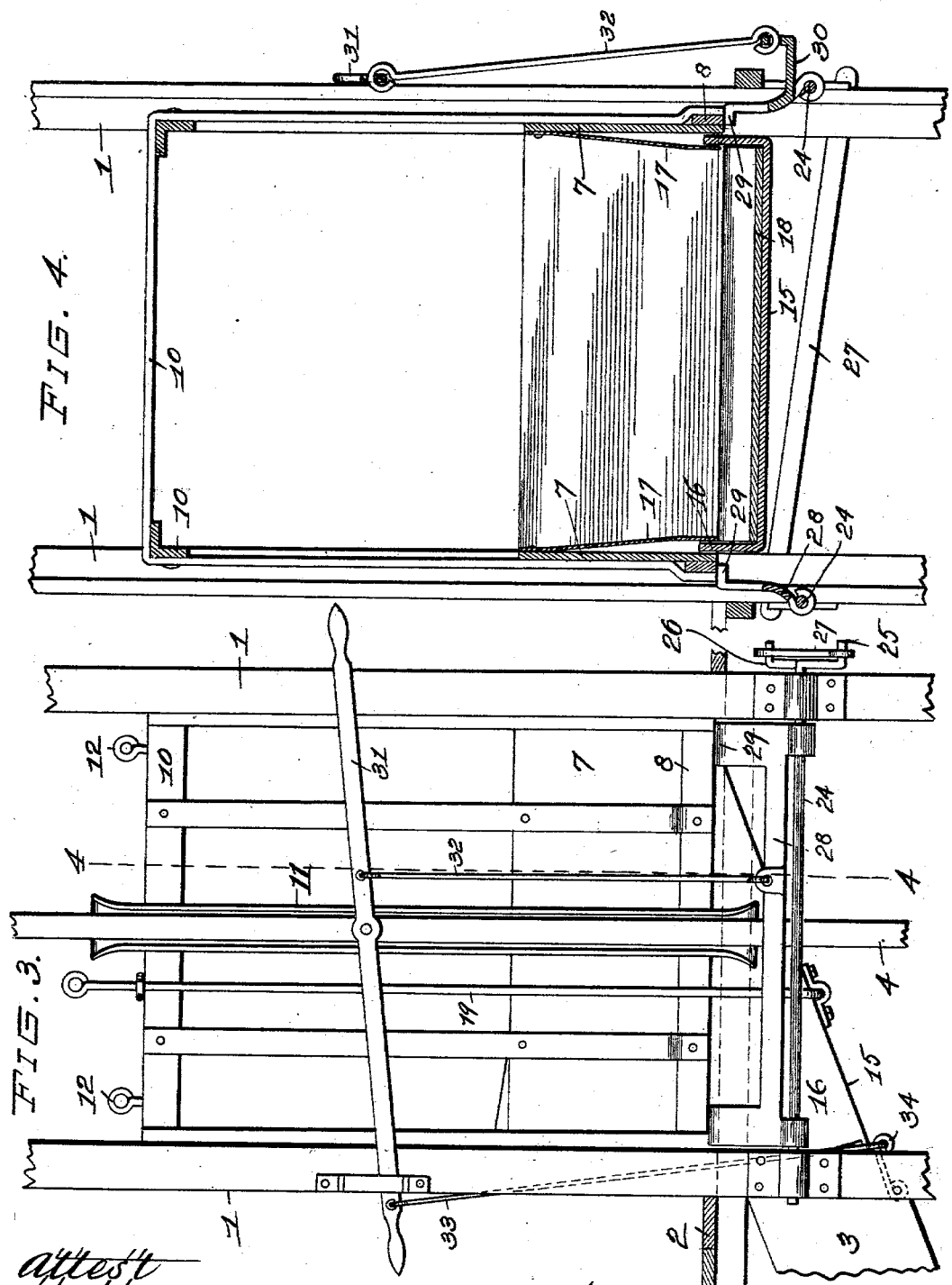

No. 629,854. Patented Aug. 1, 1899.
J. W. HALL.
HOISTING CAGE FOR MINES.
(Application filed May 8, 1899.)
(No Model.) 3 Sheets—Sheet 3.
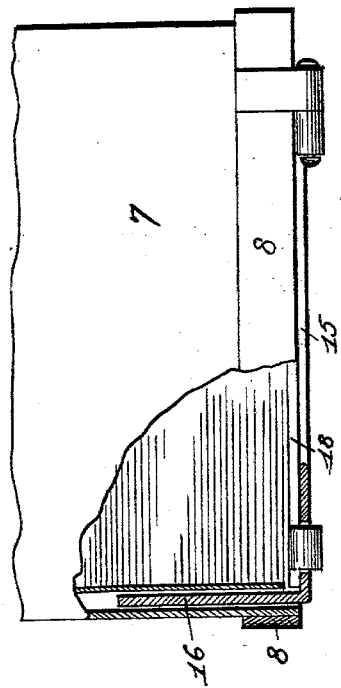
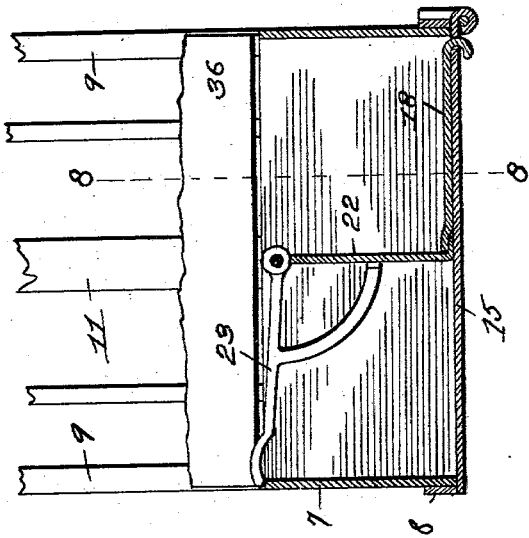
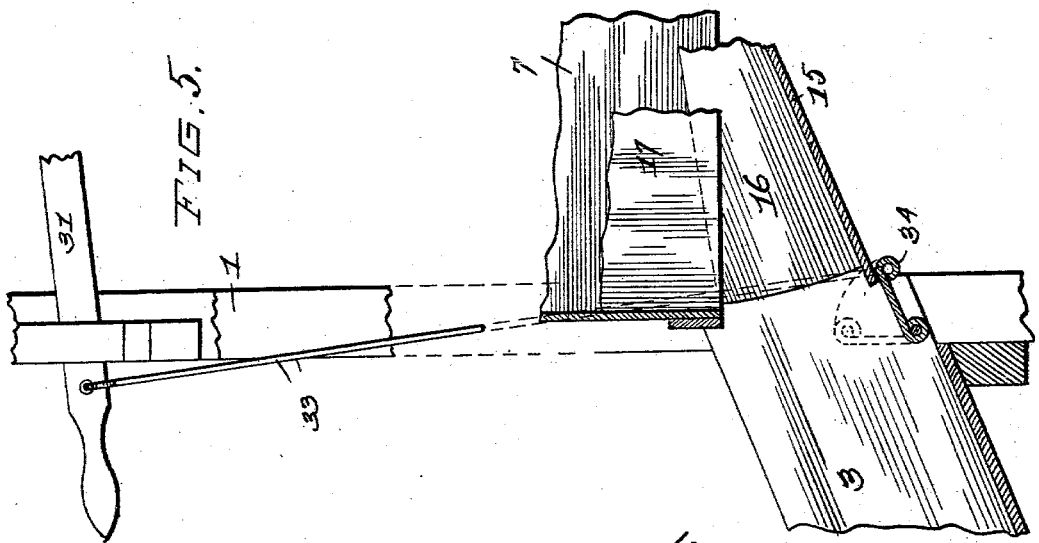
Inventor:—
James W. Hall
Attest
W. P. Smith
A. J. McCauley

UNITED STATES PATENT OFFICE.

JAMES W. HALL, OF COFFEEN, ILLINOIS.

HOISTING-CAGE FOR MINES.

SPECIFICATION forming part of Letters Patent No. 629,854, dated August 1, 1899.

Application filed May 8, 1899. Serial No. 716,050. (No model.)

*To all whom it may concern:*

Be it known that I, JAMES W. HALL, of the city of Coffeen, Montgomery county, State of Illinois, have invented certain new and useful Improvements in Hoisting-Cages for Mines, of which the following is a full, clear, and exact description, reference being had to the accompanying drawings, forming a part thereof.

My invention relates to hoisting-cages for mines; and it consists of the novel construction, combination, and arrangement of parts hereinafter shown, described, and claimed.

Figure 1:
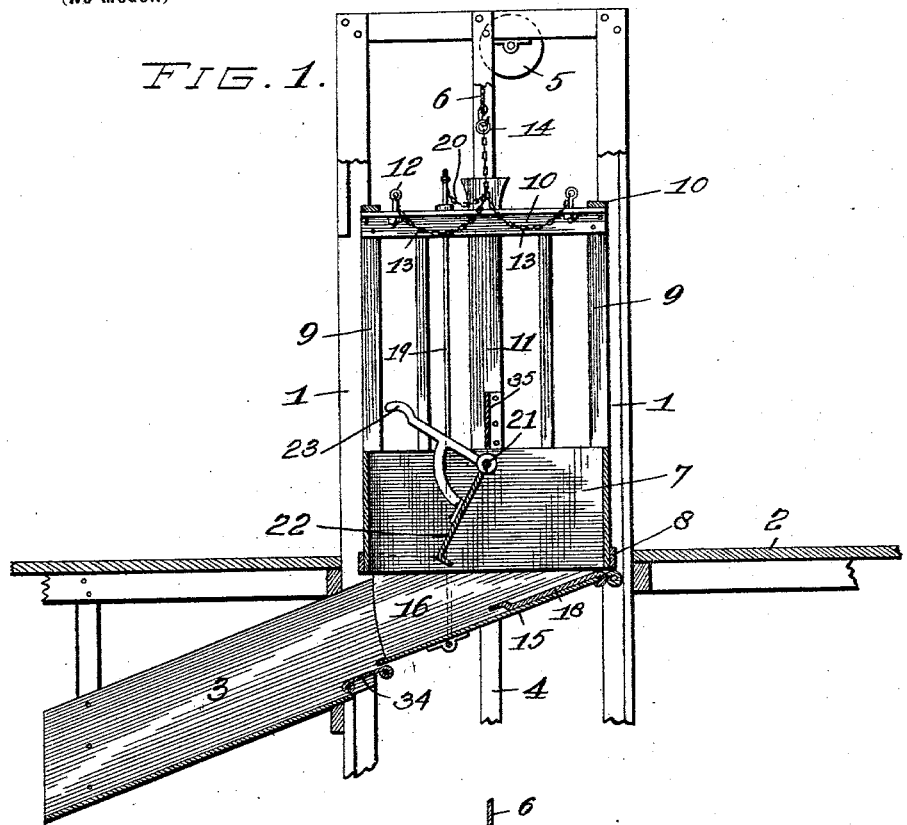
Figure 2:
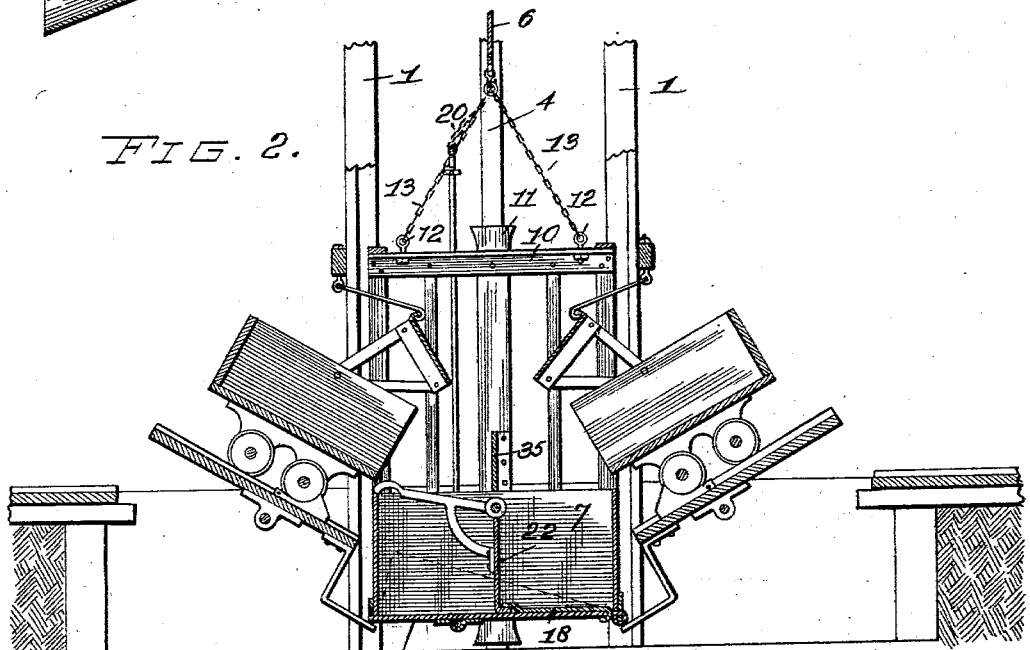

Figure 1 is a vertical sectional view of my improved hoisting-cage at its upper limit of movement and showing said cage discharging its load into a chute. Fig. 2 is a vertical sectional view of the cage at the lower end of the shaft in position while receiving its load. Fig. 3 is a side elevation of the cage, the same being shown as discharging its load. Fig. 4 is a vertical sectional view taken approximately on the line 4 4 of Fig. 3. Fig. 5 is a detail sectional view illustrating a swinging gate that is arranged between the fixed chute and against which the bottom of the cage engages when the cage is discharging its contents. Fig. 6 is a rear elevation of the lower portion of the cage, parts being broken away and in section to more clearly illustrate the same. Fig. 7 is a longitudinal sectional view taken through the center of the cage and showing a modified construction. Fig. 8 is a vertical sectional view taken approximately on the line 8 8 of Fig. 7.

Referring by numerals to the accompanying drawings, 1 1 indicate vertical uprights or corner-posts, which, together with suitable cross-bars, form the framework in which my improved cage operates, which framework extends from the lower end of the shaft to a suitable point above the ground, and the platform 2 is built around said framework at a point above the surface of the ground. Leading from the space within the framework in which the cage operates outwardly beneath the platform 2 is a chute 3, which may discharge directly onto the scales or any suitable point. Tracks or guideways 4 are arranged on the sides of the framework at points midway between the corner-posts thereof, and in the top of the framework a sheave or pulley 5 is located, over which operates a cable 6, that is used for hoisting and lowering the cage.

In the construction of the cage I make use of a rectangular open-bottomed box 7, the same being constructed, preferably, of sheet metal and of such size as that it will readily operate in the framework previously described, and extending around the outer surface of the lower edge of this box is a strengthening-strip 8. Fixed to and extending upwardly from each corner of the box 7 are the upright bars 9, the same being framed together at their upper ends by the cross-pieces 10, and fixed to the sides of the box and to the said cross-pieces 10 are the shoes 11, the same being U-shaped in cross-section, which shoes operate directly upon and against the tracks 4, previously mentioned. Extending upwardly from the cross-bars 10 are the eye-bolts 12, to which are secured the lower ends of chains or cables 13, the same extending upwardly a short distance and being united to a ring 14, which is engaged by a hook that is fixed to the end of the cable 6.

Hinged to the rear lower edge of the box 7 is a door or gate 15, the same being of such size as that it will close the entire bottom of said box 7, and the sides of said door or gate 15 are provided with vertically-arranged wings 16, which extend upwardly just inside the side walls of the box 7, and false sheet-metal sides 17 are secured to the inner surface of the tops of the sides of said box 7, and said wings 16 normally occupy the space between the sides of the box 7 and these false sides.

Hinged on top of the rear edge of the door or gate 15 and in such a manner as to swing upwardly therefrom is a door or gate 18, the same being arranged to close only the rear half of the box 7, and the forward edge of said door or gate 18 is slightly elevated from the door or gate 15.

Extending transversely beneath the front portion of the door or gate 15 and arranged in bearings fixed thereto is the lower portion of a U-shaped rod 19, the vertical portions of which extend upwardly outside the framework of the cage, and the upper ends of said vertical portions are secured to short sections of chain 20, the opposite ends of which are fixed to the chains 13.

Extending transversely between the upper edges of the sides of the box 7 and arranged for rotation therein is a shaft 21, which carries a vertically-arranged partition 22, the lower end of which is bent at right angles rearwardly toward the door 18, and extending at right angles from said partition and shaft 21, at each side of and within the box 7, are the operating-handles 23, the ends thereof normally resting directly upon the front edge of said box 7.

Journaled in suitable bearings fixed to the outer faces of the corner posts or timbers 1 on the sides of the framework in which the cage operates, at a point slightly below the platform 2, are the shafts 24, the end of one of which is formed into a downwardly-pending crank 25, and the end of the opposite shaft is formed into an upwardly-projecting crank 26, and the outer portions of these cranks are connected by a bar 27.

Held to rotate with the shaft 24 is a vertically-arranged plate 28, the ends of which are bent inwardly, as indicated by 29, which inwardly-bent ends are adapted to pass beneath the lower portion of the box 7 of the cage when the same is in an elevated position, and extending outwardly from one of the plates 28 is an arm 30.

Fulcrumed upon one of the vertical rails or tracks 4 on the same side of the framework as is the outwardly-projecting arm 30 is an operating-bar 31, and connected to and depending from said bar 31 is a rod 32, lower end of which connects with the outer end of the arm 30. To the left-hand end of this bar 31 is pivotally held the upper end of a vertically-arranged rod 33, the lower end of which is pivotally connected to the forward free end of a gate 34, the same being hinged just above the rear upper end of the chute 3.

If desired, a partition, such as 35, may be arranged transversely between the shoes 11 immediately above the shaft 21, said partition being either fixed or removable.

In the modified form of the cage shown in Figs. 7 and 8 a plate, such as 36, is hinged to the inner face of the side portions of the cage immediately above the box 7, which plates may be swung downwardly onto the top of the box, and sections of rail 37 are positioned upon the top sides of these plates. By this construction it is possible for a car to be run directly onto the cage and elevated or lowered therewith.

The operation is as follows: When the cage is lowered into the shaft, its weight will of course pull the chains 13 and 20 taut, and as said chains 20 are pulled upwardly the U-shaped rod 19 will consequently be drawn upwardly, and this will necessarily swing the door or gate 15 upwardly to close the lower portion of the box 7, and as said door or gate 15 swings upwardly the door or gate 18 must necessarily move therewith, and before the box receives its load it is necessary for the operator to bear downwardly upon either one of the handles 23, which movement partially rotates the shaft 21, throws the partition 22 into a vertical position, and thus brings the laterally-bent lower edge thereof into a position beneath the elevated free end of the door or gate 18. When the cage reaches the lower end of the shaft, the box is loaded or filled in any suitable manner, after which said loaded cage is elevated until it is brought to a point slightly above the platform 2. An operator standing on said platform then depresses the left-hand end of the bar 31, and in so doing swings the gate 34 downwardly into the position shown by solid lines in Fig. 5, and at the same time the outer end of the arm 30 is elevated, and consequently the inwardly-bent ends 29 of the plate from which this arm 30 projects are swung inwardly, which movement necessarily slightly rotates the shaft 24, which carries said plate, and as said shaft rotates the opposite one of said shafts 24 will be correspondingly rotated by the action of the oppositely-arranged cranks 25 and 26 and connecting-bar 27, and as a result of this movement the inwardly-bent upper ends 29 of the plates 28 are moved inwardly into the path of travel of the box 7 of the cage. After this movement has been accomplished the cage is gradually lowered until the lower edge of the box 7 rests directly upon the inwardly-bent upper ends 29 of the plates 28, and as the cable 6 is allowed to slacken the chains 13 and 20 will correspondingly slacken and the U-shaped rod 19 will gravitate downwardly, thus allowing the door or gate 15 to swing downwardly until its edge rests directly upon the free end of the door or gate 34. This operation will of course allow that portion of the load that is in the left-hand half of the box 7 to discharge downwardly over the free end of the door 15, over the gate 34, and into and through the chute 3, and when the door 15 moves downwardly to allow the discharge of this portion of the load that portion of the load within the right-hand portion of the box will remain therein, for the reason that the door or gate 18 is held in a perfectly horizontal position, for the reason that its free end is engaged by the laterally-bent lower end of the partition 22, and after the load in the left-hand portion or compartment of the box 7 has been discharged the operator engages either one of the handles 23, pulls upwardly on the same, and in so doing withdraws the laterally-bent lower edge of the partition 22 from the free edge of the door or gate 18 and allows the same to swing downwardly onto the door or gate 15, thus discharging the load that has been held in the right-hand portion or compartment of the box 7. After the load of the cage has been discharged and it is desired to lower said cage into the shaft said cage is slightly elevated, and in so doing the doors or gates 15 and 18 are swung upwardly, after which the operator depresses the outer end of either one of the handles 23 and then elevates the right-hand end of the bar 31, thus raising the gate 34 into the position shown by dotted lines in Fig. 5 out of the way of the descending cage and at the same time throwing the inwardly-bent upper ends 29 of the plates 28 outwardly from beneath the box 7. It is essential that the operator engage either one of the hand-levers 23 to swing the partition 22 into a vertical position, as this action will take place when the load is discharged into the left-hand portion or compartment of the box 7.

In Fig. 2 I have shown the cage being filled or loaded from a pair of tilting cars; but said cage may be loaded in any suitable manner.

By the construction shown in Figs. 7 and 8 it is possible to run a loaded car directly onto the cage and either elevate or lower the same. To do this, it is only necessary to allow the plates 36 to swing downwardly, thus bringing the rails 37 into coincidence with the rails upon which the car moves.

By my improved construction the capacity of a mine is increased, much time and labor are saved in the handling of the mine product, but a single operator is needed upon the platform 2, and it is not necessary to elevate and lower the cars in which the mine product is brought to the hoisting-cage.

The improved cage is applicable for mines of all classes wherein the mine product is elevated through a shaft, and its many advantages will readily suggest themselves to persons familiar with mines and mining.

I claim—

1. A hoisting-cage for mines, constructed with a rectangular receptacle, a door hinged to close the entire lower end of the receptacle, which door is held closed by the weight of the cage, a door hinged to one end of the first-mentioned door and closing half of the receptacle, and a vertically-arranged partition in said receptacle, the lower edge of which engages the edge of the second-mentioned door, substantially as specified.

2. A hoisting-cage for mines, constructed with a rectangular receptacle, a gate hinged at one end to close the entire lower end of said receptacle, which gate is held closed by the weight of the cage, a second door hinged to the first-mentioned door and closing one-half of the receptacle, a vertically-arranged partition in said receptacle, the lower edge of which engages the free end of the last-mentioned door, means whereby said partition is swung laterally to disengage the edge of the second door, a framework in which the cage operates, and means whereby said cage is held at a desired point in said framework, substantially as specified.

3. In a hoisting-cage for mines, a vertically-arranged framework, a chute leading from said framework, a cage operating vertically through said framework, a receptacle at the lower end of said cage, a hinged door closing the lower end of said receptacle, which hinged door is held closed by the weight of the cage, a pair of plates arranged to swing beneath the lower edge of the receptacle when it is desired to discharge the contents of said receptacle, and means whereby said plates are simultaneously operated, substantially as specified.

4. In a hoisting-cage for mines, a receptacle, a partition arranged in said receptacle, and a pair of doors arranged to close the bottom of said receptacle, which doors are so arranged as that the contents of the receptacle on either side of the partition may be discharged at different intervals, substantially as specified.

In testimony whereof I affix my signature in presence of two witnesses.

JAMES W. HALL.

Witnesses:
EDWARD E. LONGAN,
ALBERT J. McCAULEY.